US007487461B2

(12) United States Patent
Zhai et al.

(10) Patent No.: US 7,487,461 B2
(45) Date of Patent: Feb. 3, 2009

(54) SYSTEM AND METHOD FOR ISSUING COMMANDS BASED ON PEN MOTIONS ON A GRAPHICAL KEYBOARD

(75) Inventors: Shumin Zhai, San Jose, CA (US); Per-Ola Kristensson, Linkoping (SE)

(73) Assignee: International Business Machines Corporation, Armonk, NY (US)

( * ) Notice: Subject to any disclaimer, the term of this patent is extended or adjusted under 35 U.S.C. 154(b) by 489 days.

(21) Appl. No.: 11/121,637

(22) Filed: May 4, 2005

(65) Prior Publication Data
US 2006/0253793 A1    Nov. 9, 2006

(51) Int. Cl.
G06F 3/048 (2006.01)
G06F 3/033 (2006.01)
G06F 3/041 (2006.01)
G06F 3/02 (2006.01)
A63F 9/24 (2006.01)
G06K 9/00 (2006.01)

(52) U.S. Cl. .............. 715/773; 715/863; 345/173; 345/168; 463/37; 382/229

(58) Field of Classification Search ........ 715/773, 715/863; 463/37; 345/168, 173; 382/229
See application file for complete search history.

(56) References Cited

U.S. PATENT DOCUMENTS

| 5,574,482 | A | * | 11/1996 | Niemeier | 345/173 |
| 5,583,946 | A | * | 12/1996 | Gourdol | 382/187 |
| 5,596,656 | A | | 1/1997 | Goldberg | |
| 5,615,284 | A | | 3/1997 | Rhyne et al. | |
| 5,689,667 | A | | 11/1997 | Kurtenbach | |
| 5,764,794 | A | | 6/1998 | Perlin | |
| 5,798,758 | A | * | 8/1998 | Harada et al. | 715/863 |
| 5,880,743 | A | * | 3/1999 | Moran et al. | 345/473 |
| 6,094,197 | A | | 7/2000 | Buxton et al. | |
| 6,121,960 | A | | 9/2000 | Carroll et al. | |

(Continued)

FOREIGN PATENT DOCUMENTS

GB    2 380 583 A    4/2003

(Continued)

OTHER PUBLICATIONS

Zhai et al., Apr. 5-10, 2003, ACM, "Shorthand Writing on Stylus Keyboard".*

(Continued)

Primary Examiner—William L. Bashore
Assistant Examiner—Ece Hur
(74) Attorney, Agent, or Firm—Shimokaji & Associates, P.C.

(57) ABSTRACT

A command pattern recognition system based on a virtual keyboard layout combines pattern recognition with a virtual, graphical, or on-screen keyboard to provide a command control method with relative ease of use. The system allows the user conveniently issue commands on pen-based computing or communication devices. The system supports a very large set of commands, including practically all commands needed for any application. By utilizing shortcut definitions it can work with any existing software without any modification. In addition, the system utilizes various techniques to achieve reliable recognition of a very large gesture vocabulary. Further, the system provides feedback and display methods to help the user effectively use and learn command gestures for commands.

18 Claims, 15 Drawing Sheets

U.S. PATENT DOCUMENTS

| | | | |
|---|---|---|---|
| 6,788,815 B2 * | 9/2004 | Lui et al. | 382/187 |
| 2004/0120583 A1 * | 6/2004 | Zhai | 382/229 |
| 2004/0140956 A1 * | 7/2004 | Kushler et al. | 345/168 |
| 2005/0190973 A1 * | 9/2005 | Kristensson et al. | 382/229 |

FOREIGN PATENT DOCUMENTS

| | | |
|---|---|---|
| WO | WO 2004/079557 A1 | 9/2004 |

OTHER PUBLICATIONS

Zhai, et al., Apr. 20-25, 2002, ACM, "Movement Model, Hits Distribution and Learning in Virtual Keyboarding".*

Goldberg, et al., Apr. 24-29, 1993, "Touch-Typing With a Stylus".*

Zhai, et al., 2002, Human Computer Interaction, vol. 17, pp. 89-102. "Performance Optimization of Virtual Keyboards".*

Kim, et al., Vision-Based Eye Gaze Tracking For Human Computer Interface, IEEE, 1999, pp. 324-329.*

Per-Ola Kristensson, "Design and Evaluation of a Shorthand Aided Soft Keyboard", Aug. 28, 2002, Master's Thesis in Cognitive Science, Sweden.*

J. Callahan, et al., "An Empirical Comparison of PIE Vs. Linear Menus," ACM 1998, pp. 95-100.

F. Guimbretiere, et al., "FlowMenu: Combining Command, Text, and Data Entry," Proceedings of the 13th Annual ACM symposium on User interface software and technology, Nov. 6-8, 2000, San Diego, California, USA p. 213-216.

M. Kobayashi et al., "Considering the Direction of Cursor Movement for Efficient Traversal of Cascading Menus," ACM 2003, pp. 91-94.

G. Kurtenbach et al., "The Limits of Expert Performance Using Hierarchical Marking Menus," ACM 1993, pp. 482-287.

G. Kurtenbach et al., "The Hotbox: Efficient Access to a Large Number of Menu-items," CHI 1999, pp. 231-237.

Dean Rubine, "Specifying Gestures by Example," ACM 1991, pp. 329-337.

S. Zhao et al., "Simple vs. Compound Mark Hierarchical Marking Menus," UIST 2004, Chi vol. 6, Issue 2, pp. 33-42.

* cited by examiner

SYSTEM AND METHOD FOR ISSUING COMMANDS BASED ON PEN MOTIONS ON A GRAPHICAL KEYBOARD

CROSS-REFERENCE TO RELATED APPLICATION

The present application relates to co-pending U.S. patent application titled "System and Method for Recognizing Word Patterns Based on a Virtual Keyboard Layout," Ser. No. [10/325,197], which was filed on Dec. 20, 2002, and to copending U.S. patent application titled "System and Method for Recognizing Word Patterns in a Very Large Vocabulary Based on a Virtual Keyboard Layout", Ser. No. [10/788,639], which was filed on Feb. 27, 2004, both of which applications are assigned to the same assignee as the present application and are incorporated herein by reference.

FIELD OF THE INVENTION

The present invention generally relates to issuing commands to operation systems on pen-based computing and communication devices, particularly commands via pen-motions on graphical keyboards. Commands, such as copy and paste commands, conventionally issued by the user through short cuts and function keys in desktop computers, are activated by pen motions on a graphical keyboard. The present invention also relates to computing devices with touch sensing or trajectory sensing methods other the digital pen, including electronic whiteboards and tabletop computers.

BACKGROUND OF THE INVENTION

Pen-based devices, including Tablet PCs, personal digital assistants (PDAs), and advanced smart phones, are increasingly important forms of computing and commutation. One of the challenges to make these devices usable is the lack of physical input devices such as the mouse and the desktop keyboard. In particular, conventional pen-based devices lack convenient methods for issuing commands to operating systems and applications on these devices. On desktop computers, commands are accessible through graphical menus. Frequent commands, such as copy and paste commands, are also accessible through keyboard shortcuts. Shortcuts are faster and less attention demanding than graphical menus. A user does not have to look for the menus whose locations vary from application to application. Certain shortcuts tend to be universal across applications. For example, Control-C typically executes a copy command. Similarly, Control-B typically executes a bold command. A user can reliably count on these basic operations for various software applications.

A basic method of issuing commands on a pen-based computer is the same as on a desktop PC: linear and hierarchical pull-down menus. Pull-down menus are more problematic on a pen-based computer for a number of reasons. The pen (stylus) and the stylus holding hand of the user often obscure the very items on the pull-down menu the user needs to find and select. Moreover, pen motion on a screen is one-to-one in scale. In contrast, other pointing devices comprise a rate-accelerated control-to-display gain (e.g., a power-mouse), so that a user does not have to move the pointing device over a large distance to reach a far-away menu. Furthermore, moving a pen on the screen is usually not as well supported as moving a mouse on a desktop. Consequently, an alternative shortcut approach to the graphical menu items are even more desirable for pen-based devices.

Several conventional methods enhance command selection capabilities on pen-based computers and devices. One conventional method demonstrates a technique that makes linear menu traversal easier when navigating through sub-menus [reference is made to Kobayashi, M., et. al., "Considering the Direction of Cursor Movement for Efficient Traversal of Cascading Menus", Proc. UIST 2003, pp. 91-94]. Another conventional method comprises a technique called Hotbox that combines linear, radial and pop-up menus to create a Graphical User Interface (GUI) that can handle over 1,000 commands for the a graphical modeling application [reference is made to Kurtenbach, G., et. al., "The Hotbox: Efficient Access to a Large Number of Menu-items", Proc. CHI 1999, pp. 231-237.]

Other conventional methods utilize pie menus as an alternative to pull-down linear menus [reference is made to Callahan, J., et. al., "An Empirical Comparison of Pie vs. Linear Menus", Proc. CHI 1988, pp. 95-100]. Marking menus further improve pie menus [reference is made to Kurtenbach, G., et. al., "The Limits of Expert Performance Using Hierarchic Marking Menus", Proc. CHI 1993, pp. 482-487]. Marking menus are pie menus augmented with a gesture recognizer. Novice users select items in the pie menu structure as if using a regular pie menu (albeit with delayed display). Over time, users learn the angular gestures for selecting an command. This allows expert users to quickly flick the gesture of the command without the need to visually traverse a pie menu hierarchy. To encourage users to learn the fast mode of gesturing commands instead of using slower visual feedback-based navigation, marking menus do not "pop-up" until after a time delay.

However, some marking menu selections are ambiguous when marks are articulated independent of scale. Furthermore, deeply nested menu selections result in complex gestures that cannot be articulated on a small space. One conventional method uses consecutive simple marks instead of compound marks in marking menus [reference is made to Zhao, S., et. al., "Simple vs. Compound Mark Hierarchical Marking Menus", Proc. UIST 2004, pp. 33-42]. Simple marks are unambiguous and require only a small space to articulate. Simple marks can be articulated approximately as fast as compound marks. However, users may not be able to memorize a sequence of disconnected simple marks as fast and as easily as compound marks that can be perceived and remembered as a whole. Another conventional system uses FlowMenu, a variant of the marking menu [reference is made for example, to Guimbretière, F., et. al., "FlowMenu: Combining Command, Text and Data Entry", Proc. UIST 2000, pp. 213-216]. With FlowMenu, a user can, for example, choose to zoom with a numeric value and enter the zoom value in one holistic gesture. However, gestures required by FlowMenu are long and complicated.

Other conventional systems use free-form pen gestures as command articulation. These conventional systems come in many forms and variants such as, for example, the Rubine gesture recognizer [reference is made to Rubine, D., "Specifying Gestures by Example", Proc. SIGGRAPH 1991, pp. 329-337]. Free-form pen gestures are often "arbitrary" gestures that are used to denote different actions in a user interface. In general, free form gestures are limited in capacity (the number a user can remember and reproduce) due to their arbitrary definition to the user.

Each conventional pen-based command selection technique has advantages and disadvantages. Users are familiar with linear menus and they are backwards compatible with virtually all existing desktop and handheld programs. Marking menus have an advantage in applications where the user frequently needs rapid access to a limited number of commands. Special techniques such as the Hotbox can be used when an application needs to provide access to over 1,000 commands. Free-form pen gestures are most advantageous in application domains that have a strong convention, such as copy editing, or in places where gestures can be highly metaphorical, such as crossing a series of words to cause the words to be deleted.

Although some of these conventional solutions are adequate for their intended purpose, it would be desirable to have a pen-based system and an associated method for issuing commands that is similar to the role of keyboard shortcuts in desktop computers while taking advantage of the fluidity of the pen. Such a system and method should be easy to learn, obvious to the user, fast to execute, and easily applicable to software applications without modification. The need for such a solution has heretofore remained unsatisfied.

SUMMARY OF THE INVENTION

The present invention satisfies this need, and presents a system and associated method (collectively referred to herein as "the system" or "the present system") for enabling a user to issue commands via pen-gestures on a graphical keyboard (also commonly referenced as a virtual, graphical, soft, or stylus keyboard). The present system determines an command from the shape and location of a pen stroke formed by a user on a graphical keyboard. The present system then sends the determined command to an command recipient such as, for example, an application, an operating system, etc. Commands issued in this approach are referred as "gesture shortcuts" or "command gestures". The present system requires no special modification for desktop applications to work on pen-based devices.

The present system recognizes the gesture shortcuts on a graphical keyboard based on a set of criteria. The present system matches the pen stroke with ideal templates in a database, where each template is a gesture defined by the positions from a starting key to an ending key in the pen stroke.

One method of defining a template for gesture shortcuts (further referenced herein as an command template) uses the "hot key" conventions in common applications. For example, a "Copy" command is defined by a straight line from a key "Ctrl" to a key "c", and a "reboot" command is defined by a trajectory for "Ctrl-Alt-Delete". Another approach to define an command template for a gesture uses the more descriptive word(s), or parts of the word(s), that name the command. In one embodiment, the descriptive word(s) or part of the word (s) is prefixed with a function key. For example the "copy" command can be defined by the keyboard trajectory "Ctrl-C-O-P-Y" or "Ctrl-C-O-P", and a "Track changes" command by "Ctrl-T-R-C-H-G".

In another embodiment, commands are represented as models obtained from training data or user demonstration. Recognizing an command comprises classifying a gesture according to these models [reference is made, for example, to Duda, R. O., et. al., "Pattern Classification", John Wiley & Sons, Inc., New York, 2nd edition, 2001].

A pattern recognizer in the present system examines various geometric properties of a gesture shape and issues a corresponding command if the degree of match to the corresponding command passes a predetermined threshold. To maximize flexibility as well as efficiency for the user, the present system uses multiple channels of information to recognize the intended command. The present system treats different aspects of the pattern classification process as different channels. These channels may operate in parallel or in series depending on the nature of their contribution. The basic channels of information are shape and location. The present system can be extended with more channels, such as an interaction context dependent on a preceding command or preceding actions.

For the purpose of entering ordinary text, not command selection, pen gestures on graphical keyboard have been proposed as a shorthand writing method for words in English or other natural languages. In this method of shorthand gesturing for text entry, each pen stroke on a graphical keyboard can be interpreted as a word [reference is made to both related applications, supra, Ser. Nos. 10/325,197 and 10/788,639].

The present system can be implemented on an ordinary graphical keyboard in which a key is tapped serially one letter at a time. The present system interprets any continuous stroke on the graphical keyboard as an command since taps and strokes can be easily separated by their size relative to the size of a key in the graphical keyboard. Consequently, no prefix key such as Ctrl or Alt is required for the gesture shortcuts when the present system is implemented on an ordinary graphical keyboard.

The present system can further be implemented with the method of gesture shorthand on keyboard for text entry disclosed in Ser. Nos. 10/325,197 and 10/788,639. To distinguish command gesture shortcuts from gestures on keyboard as ordinary text input, command templates of the present system comprise a prefix key such as a Ctrl or Alt key. Criteria for recognizing command gestures are more stringent than for [ordinary text words]. For example, the word "word" in text entry can be recognized by a gesture whose shape is sufficiently close to the shape "w-o-r-d" on the keyboard layout.

One embodiment requires that the starting point of an command gesture begin at a designated special key. For the "cut" command (comprising "Ctrl-C-U-T"), one embodiment requires that the starting point of the gesture begins at a designated special key as such as the ctrl key on the keyboard. The ending point does not have to be exactly on the key "y", if the confidence of a recognizer is high. The recognizer uses probabilistic methods to determine if the gesture is intended for a particular command.

The present system can be implemented on any keyboard layout such as, for example, the QWERTY layout. Alternatively, the present system can be implemented on layouts optimized for stylus motion. One example of an optimized layout is the ATOMIK (Alphabetically Tuned and Optimized Mobile Interface Keyboard) layout [reference is made, for example, to Zhai, S., et. al. "Performance Optimization of Virtual Keyboards", Human-Computer Interaction 17, pp. 89-129].

Furthermore, the present system can be implemented on any graphical "keyboard" including special symbols for special purpose command and control systems. Each of the keys on such a keyboard does not have to be a letter. One or more of the keys on such a keyboard can represent an command such that a series of commands can be selected by one gesture shortcut.

Commands in the present system are broadly defined as a list of options on a computer accessible to a user. Commands comprise menu actions such as, for example, "copy" "paste" "delete" "change fonts to red" "track changes", etc. Commands can also comprise any executable application such as, for example, "email" "web browser", or a list of names and addresses.

The present system may be used with any application using a virtual keyboard or electronic input with a stylus. Such applications may be, for example, Personal Digital Assistants (PDAs), electronic white boards, cellular phones, tablet computers, table top computers, digital pens, etc. Additionally, the present system may be used with any application using an command gesture on a graphical input tablet such as, for example, court reporting machines, dictation systems, retail sales terminals, etc.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Command: options available on a computer accessible to a user such as, for example, menu actions (e.g., "copy", "paste", "change fonts to red", "track changes", etc.) or executable actions (e.g., "email", "web browser", etc.)

ATOMIK (Alphabetically Tuned and Optimized Mobile Interface Keyboard): A keyboard layout optimized by an algorithm in which the keyboard was treated as a "molecule" and each key as an "atom". The atomic interactions among the keys drive the movement efficiency toward the minimum. Movement efficiency is defined by the summation of all movement times between every pair of keys weighted by the statistical frequency of the corresponding pair of letters. ATOMIK is also alphabetically tuned, causing a general tendency that letters from A to Z run from the upper left corner to the lower right corner of the keyboard, helping users find keys that are not yet memorized. ATOMIK is one exemplary virtual keyboard that can be used in combination with the present invention.

Elastic Matching: A conventional hand writing recognition method. Reference is made, for example, to Tappert, C. C., "Speed, Accuracy, Flexibility Trade-Offs in On-Line Character Recognition", Research Report RC13228, Oct. 28, 1987, IBM T.J. Watson Research Center, 1987; and Charles C. Tappert, et. al., "The State of the Art in On-Line Handwriting Recognition," IEEE Transactions on Pattern Analysis and Machine Intelligence, Vol. 12, No. 8, August 1990.

PDA: Personal Digital Assistant. A pocket-sized personal computer. PDAs typically store phone numbers, appointments, and to-do lists. Some PDAs have a small keyboard, others have only a special pen that is used for input and output on a virtual keyboard.

Virtual Keyboard: A computer simulated keyboard with touch-screen interactive capability that can be used to replace or supplement a keyboard using keyed entry. The virtual keys are typically tapped serially with a stylus. It is also called graphical keyboard, on-screen keyboard, or stylus keyboard.

Figure 1:
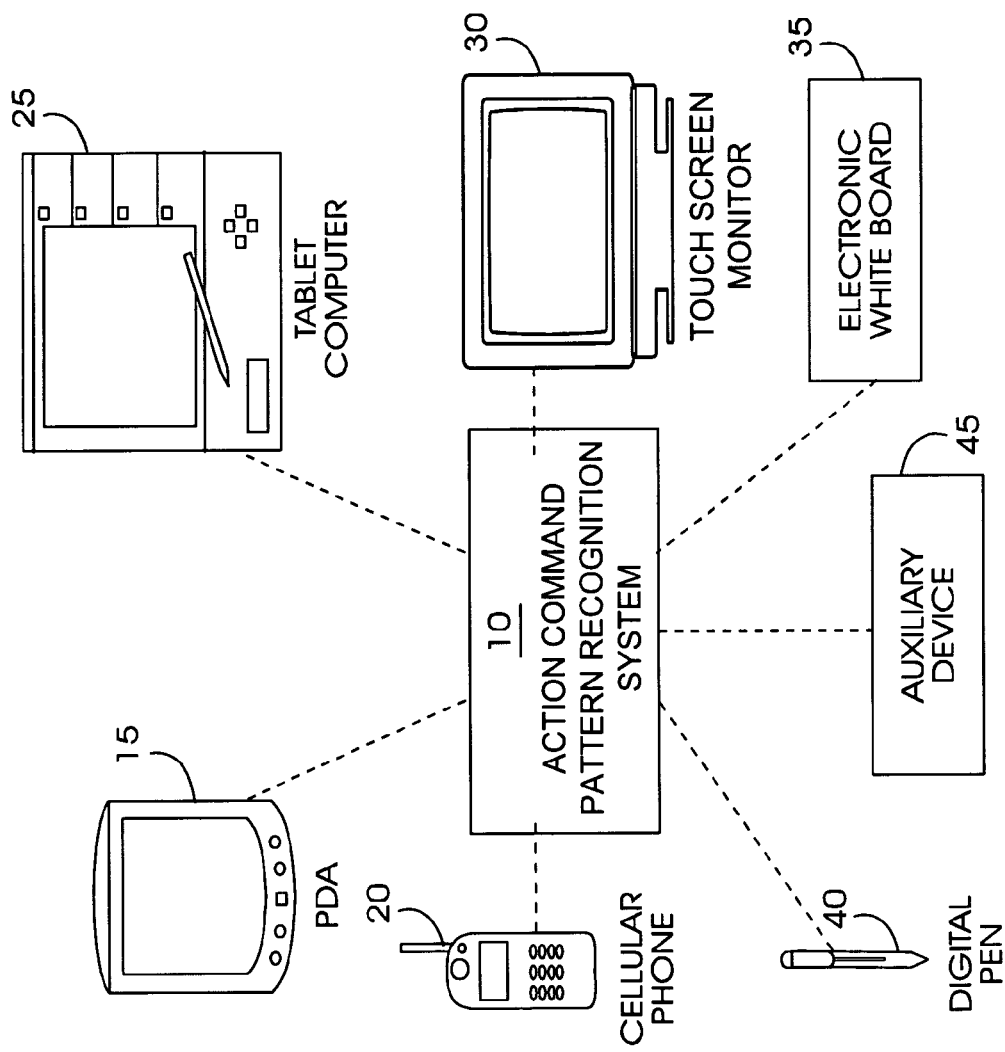
FIG. 1 is a schematic illustration of an exemplary operating environment in which an command pattern recognition system of the present invention can be used.

FIG. 1 portrays an exemplary overall environment in which a command gesture recognition system 10 (the "system 10 ") and associated method for recognizing gesture patterns on a virtual keyboard according to the present invention may be used. System 10 includes a software program code or a computer program product that is typically embedded within, or installed on a computer, or a computer-readable medium. The computer in which system 10 is installed can be a mobile device such as a PDA 15 or a cellular phone 20. System 10 can be installed in devices such as tablet computer 25, touch screen monitor 30, electronic white board 35, and digital pen 40.

System 10 can be installed in any device using a virtual keyboard or similar interface for entry, represented by auxiliary device 45. Alternatively, system 10 can be saved on a suitable storage medium such as a diskette, a CD, a hard drive, or like devices.

Figure 2:
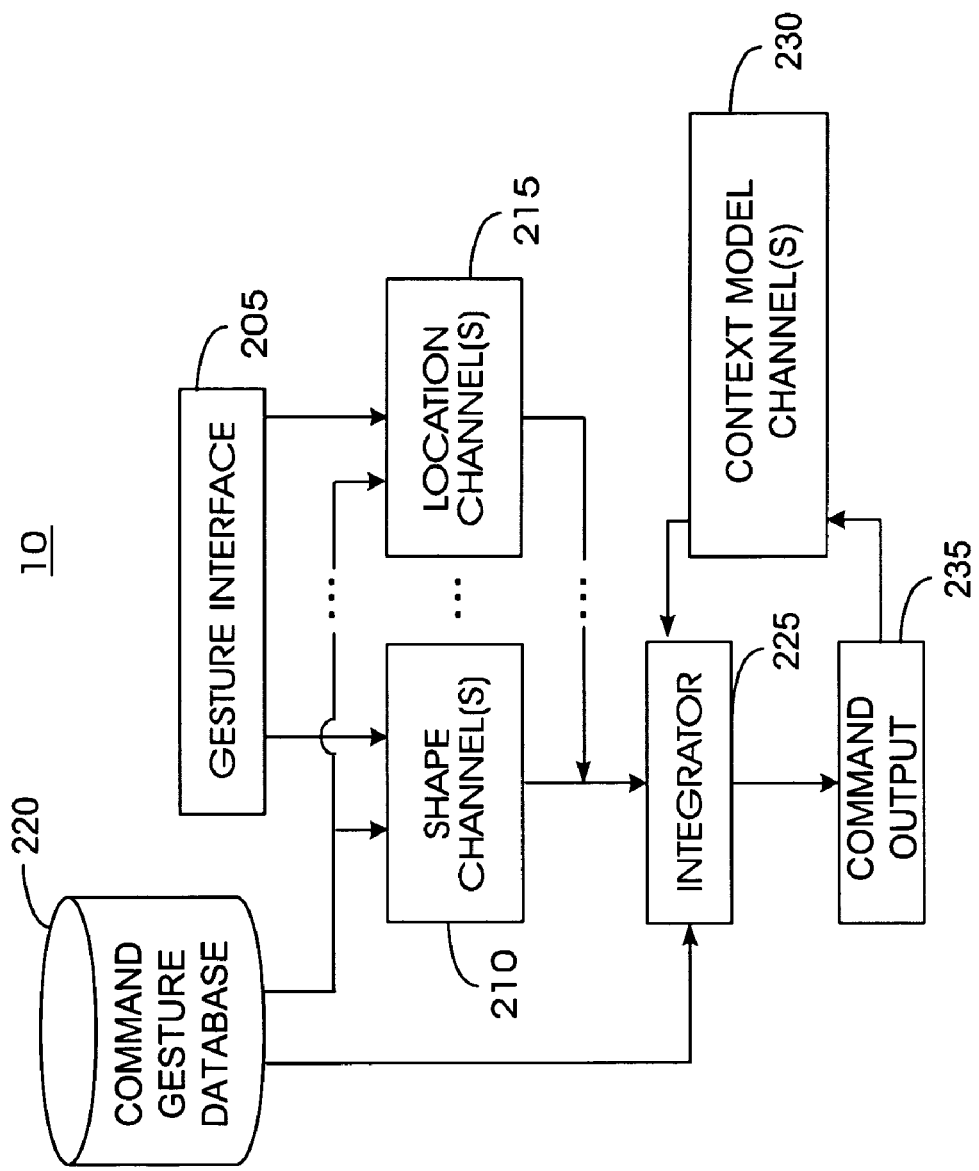
FIG. 2 is a block diagram of the high-level architecture of the command pattern recognition system of FIG. 1.

A high-level hierarchy of the system 10 is illustrated by the block diagram of FIG. 2. System 10 comprises a gesture interface 205 to capture a gesture of the user on, for example, a virtual keyboard interface. The gesture interface 205 supplies the captured command gesture (further referenced herein as a command gesture) to a shape channel 210 and a location channel 215 for analysis. In one embodiment, additional shape channels 210 and location channels 215 may be used to analyze the captured command gesture. In a further embodiment, one or more other channels may be used to analyze the captured command gesture.

The shape channel 210 and the location channel 215 analyze a captured gesture to recognize a command intended by a user. The shape channel 210 and the location channel 215 each compare the results of analysis with a database of command gestures stored in a command gesture database 220. Potential commands determined by the shape channel 210 and the location channel 215 are sent to an integrator 225.

The context model channel 230 provides context clues to integrator 225 based on one or more previous commands gestured by the user. Integrator 225 analyzes the potential command provided by the shape channel 210 and the location channel 215 with context clues from the context model channel 230 to produce a command output 235. For example, if the previous command is a "copy" command, the following command is likely to be "paste".

In the simplest case, system 10 is primarily location dependent, examining starting position and ending position of the command gesture. System 10 can be combined with the shorthand word recognizer described in the related co-pending patent application, Ser. No. 10/788,639, supra.

When presented with a command gesture that is not in the command gesture database 220, the user can teach the command to system 10, saving the command gesture and the command to the command gesture database 220.

More complex algorithms and approaches can be used to recognize an command represented by a command gesture. In one embodiment, a modified elastic matching algorithm is used. Elastic matching is a proven algorithm used in some cursive script and hand printed character recognition systems. The recognition algorithm of system 10 can be based on, for example, a classic elastic matching algorithm that computes a minimum distance between sets of points by dynamic programming. One set of points is from a shape that a user produces on a stylus tablet or touch screen (i.e., an unknown shape). Another set of points is from a prototype or command template (further referenced herein as the command template or the template), i.e., an ideal shape defined by the key positions of an command. The recognition system can also be implemented by other hand writing recognition systems. [Reference is made, for example, to Tappert, Charles C., et. al., "The State of the Art in On-Line Handwriting Recognition", "IEEE Transactions on Pattern Analysis and Machine Intelligence," Vol. 12, No. 8, August 1990, and Plamondon, Rejean, et. al., "On-Line and Off-Line Handwriting Recognition: A Comprehensive Study", IEEE Transactions on Pattern Analysis and Machine Intelligence, Vol. 22, No. 1, January 2000.]

A modified elastic matching method such as, for example, linear point-to-point matching, is similar to the elastic matching algorithm as they both do not require any training and rely on an ordered discrete set of point coordinates to classify the pattern. In contrast to the elastic matching algorithm, the modified elastic matching method performs no stretching in command template comparison.

The gesture interface 205 performs scale transformation (normalization in scale) and location transformation (normalization in translation) on the command gesture. The gesture interface 205 then interpolates the command gesture to a fixed number of points at an equidistant interval. The shape channel 210 linearly compares these points to each other within the normalized command gesture to extract specific shape features for the command gesture. This comparison is performed using the spatial (Euclidean) distance (similar results can be achieved with squared distance). The sum of the point distances is the similarity score between the patterns:

$$x_s = \sum_i \|p(i)_{unknown} - p(i)_{template}\|_2 \quad (1)$$

where $p_{unknown}$ and $p_{template}$ are patterns comprising ordered point data.

The shape channel 210 repeats this process between the command gesture and possible matching command templates in the command gesture database 220. Since the comparison function is linear, this approach is feasible in practice even for a large set of command templates. It is relatively easy to prune the set of the command templates since many template patterns can be discarded without any loss of accuracy once part of the distance sum passes a certain threshold.

In an alternative embodiment, shape may be determined by matching feature vectors. A similarity score can be computed by extracting the relevant features and calculating the similarity between these individual feature vectors to get a distance measurement between the command gesture and the command template. For example, scale and translation invariant features can be extracted from the command gesture and the command templates and can be compared using a similarity metric such as the Mahalanobis distance or Euclidean distance against clusters obtained from labeled training data. [Reference is made, for example, to Theodoridis, K., et. al., (1999) "Pattern Recognition", Academic Press.]

Location recognition is performed by the location channel 215. Integrator 225 integrates the location information from the location channel 215 with the shape information provided by the shape channel 210|. The location channel 215 uses a command template comprising template points mapped onto the keyboard layout (e.g., non-normalized) to define a shape for the command gesture. For each point in the command template, the location channel 215 finds a corresponding point in the command gesture. The location channel 215 then determines the relative distance from the point in the command template to the corresponding point in the command gesture.

The location channel 215 uses an interpolation technique if a corresponding point in the command gesture does not exist. The location channel 215 then determines the cumulative sum of those distances. A weighting function is also applied to allow different weights for points depending on their order in the pattern. The result is a similarity score between the command gesture and a pattern of an command template mapped on the keyboard layout. An exemplary weighting function pays more attention to beginning and end points than points in the middle of the pattern. Other weighting functions can be used.

System 10 calculates the output of the location channel 215 as a weighted average of the point-to-point distances between the command gesture and the command template, $x_l$ (location mismatch):

$$x_l = \frac{1}{\sum_{k=0}^{N} \alpha(k)} \left( \sum_{k=0}^{N} \alpha(k) d_2(k) \right) \quad (2)$$

where $\alpha(k)$ is the relative weight placed on the kth data point (0 to N) and $d_2$ is the Euclidean distance between the kth data point of $p_{unknown}$ and $p_{template}$. Other distances than the Euclidean distance can be used, such as, for example, the Manhattan distance or the squared Euclidean distance.

Integrator 225 integrates input provided by parallel channels such as the shape channel 210 and location channel 215. Other parallel channels may be used to provide further input to integrator 225 for selecting candidate commands for the command gesture. The integration performed by integrator 225 results in an N-best list of candidate commands for the command gesture.

To integrate the inputs from the shape channel 210, the location channel 215, and any other channels, integrator 225 converts the inputs or "scores" or matching distances to probabilities. Any number of methods can be used for this conversion from scores to probabilities. In one embodiment, integrator 225 uses the following method to perform this conversion from scores to probabilities.

The output of the shape channel 210 (or score) for command i is denoted as $x_s(i)$. Similarly the output of the location channel 215 (or score) is denoted as $x_l(i)$. For each channel such as the shape channel 210 and the location channel 215, integrator 225 converts a score x(i) for command template i to a score $y(i) \in [0,1]$:

$$y(i) = \frac{1}{\sigma\sqrt{2\pi}} \exp\left[-\frac{1}{2}\left(\frac{x-\mu}{\sigma}\right)^2\right] \quad (3)$$

where y is a variable between 0 (x is infinite) and 1 (x=0). Integrator 225 uses equation (3) because of the nature of the distance score distributions in the channels. Furthermore, equation (3) is a non-linear transformation that gives integrator 225 scores from 0 to 1 with a weighting coefficient σ that can be empirically adjusted or trained.

Integrator 225 uses σ to weigh the contribution of each channel such as the shape channel 210 and the location channel 215. As σ increases, y decreases. Lower values of y indicate that a channel such as the shape channel 210 and the location channel 215 is more discriminative. σ is also defined relative to the dimension x. System 10 specifies a pruning threshold at x=3σ; this is the maximum mismatch beyond which there is little chance the command i matches the command gesture. At x>3σ, y<0.04.

From y(i), integrator 225 can prune those command candidates for the command gesture whose y(i) score is below, for example, 0.04. Integrator 225 thus prunes the candidates from the entire command gesture database 220 (L) to a subset W before computing equation (3). Pruning may also be performed earlier to reduce computation. For example, in the process of computing the shape similarity score x, a candidate command for the command gesture can be abandoned by the shape channel 210 as soon as the mismatch surpasses 3σ.

In an alternative embodiment, σ may be dynamically adjusted by comparing the time the user spent on producing the command gesture and the estimated time it takes to produce a visually guided close-loop command pattern within the key boundaries. Such a calculation can be achieved before comparing the command gesture with the command template.

In yet another alternative embodiment, σ may be dynamically adjusted by calculating the total normative time of writing the pattern of command i:

$$t_n(i) = na + b \sum_{k=1}^{n-1} \log_2\left(\frac{D_{k,k+1}}{W} + 1\right), \quad (4)$$

where $D_{k,k+1}$ is the distance between the k th and the k+1 th letters of command i on the keyboard; W is the key width, n is the number of letters in the command; and a and b are constants in Fitts' law. In the context of virtual keyboard, their values are estimated at a=83 ms, b=127 ms. [Reference is made, for example, to Accot, J., et. al., "More than Dotting the i's—Foundations for Crossing-Basedlinterfaces", Proc. CHI. 2002, pages 73-80. Zhai, S., et. al., "Movement Model, Hits Distribution and Learning in Virtual Keyboarding", Proc. CHI. 2002., pages 17-24.]

Once $t_n(i)$ for each command and the total time of the actual gesture production $t_a$ are determined, system 10 uses these values to modify the probability calculated from the location-based classifier. System 10 uses this information to adjust the σ value with $\sigma_1$ in the equation as follows:

$$\text{If } t_a \geq t_n(i), \sigma_1 = \sigma \quad (5)$$

Equation (5) implies that if the actual time to complete a gesture is greater than the Fitts' law prediction, the user could be taking time to look for the keys. No adjustment is needed in this case.

$$\text{If } t_a \geq t_n(i), \sigma_1 = \sigma\left(1 + \gamma \log_2\left(\frac{t_n(i)}{t_a}\right)\right) \quad (6)$$

For example, if $t_a$ is 50% of $t_n(i)$, σ will increase by 100γ percent, γ is an empirically adjusted parameter, expected to be between 1 and 10.

The approach of equation (6) is more than simply adjusting the relative weight between the location and non-location channels. Equation (6) modifies the probability determined by the location channel 215 of each individual command template according to the path of the command gesture.

Integrator 225 calculates the probability of command i based on x provided by the shape channel 210 and the location channel 215 for those candidate commands for the command gesture that has not been pruned (i∈W):

$$p(i) = \frac{y(i)}{\sum_{i \in w} y(i)} \quad (7)$$

With the probability $p_s(i)$ from the shape channel 210 and $p_l(i)$ from the location channel 215, integrator 225 selects or integrates the candidate commands from the shape channel 210 and the location channel 215. For example, a channel such as the shape channel 210 has one candidate command whose probability is close to 1. The location channel 215 has more than one candidate command; consequently, no candidate commands have probabilities close to 1. Integrator 225 then selects the candidate command from the shape channel 210 based on the relatively high probability of that candidate command.

[The shape channel 210 and location channel 215 may each have multiple candidate commands. Integrator 225 then integrates the candidate commands from the shape channel 210 and location channel 215 into a final N-best list, with a probability for each candidate command template as:]

$$p(i) = \frac{p_s(i)p_l(i)}{\sum_{j \in W_s \cap W_l} p_s(j)p_l(j)} \quad (8)$$

Figure 3:
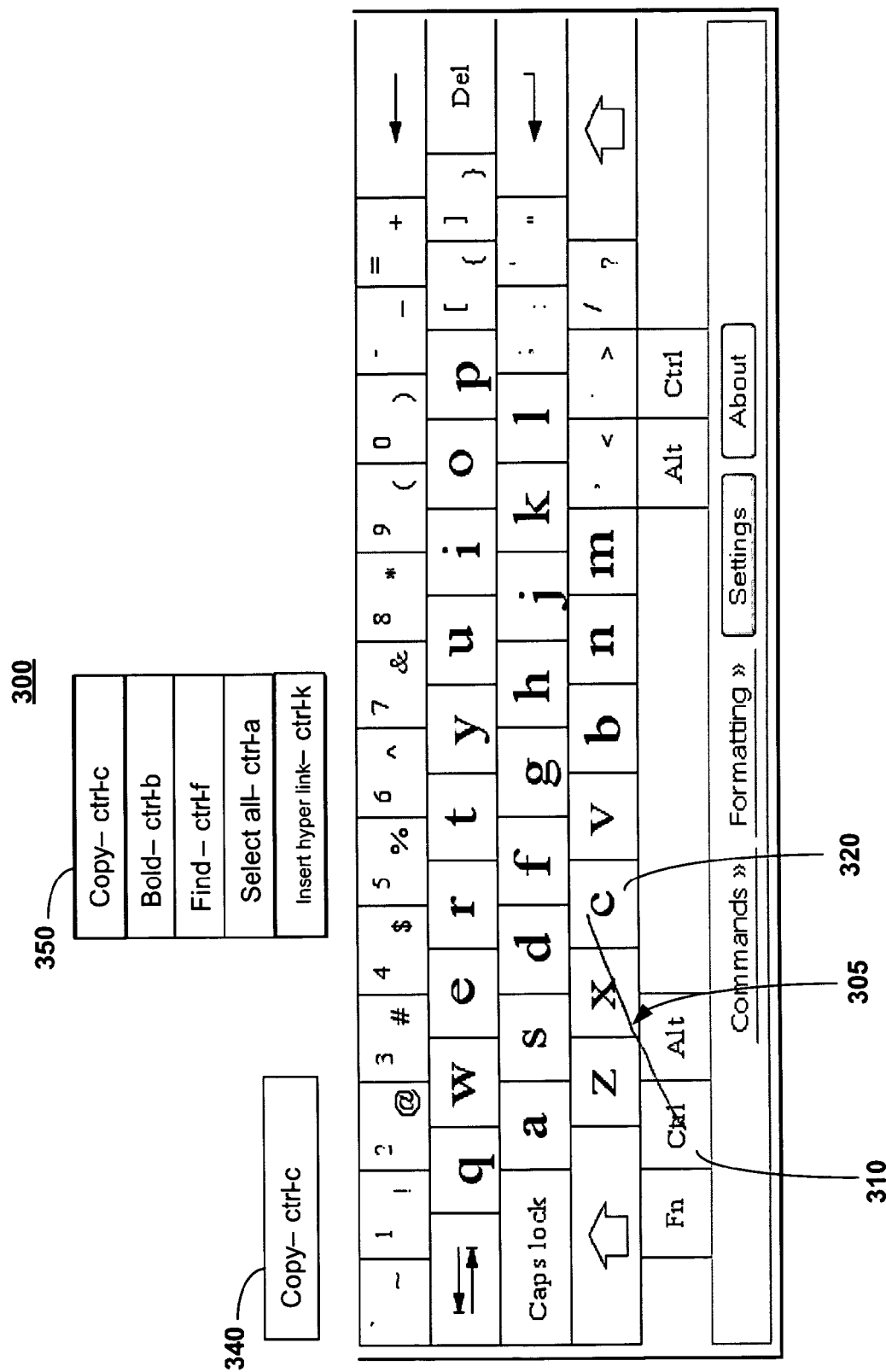
FIG. 3 is a screen shot of an exemplary pen-stroke on the graphical keyboard command interface with QWERTY layout in which a "copy" command is activated by the user, according to the command pattern recognition system of FIGS. 1 and 2.

FIG. 3 illustrates a command gesture 305 on a graphical keyboard 300 with a QWERTY layout (further referenced herein as the QWERTY graphical keyboard 300) for activating a "copy" command. The command gesture 305 sequentially traverses a virtual "Ctrl" key 310 and a virtual "c" key 320. System 10 detects a command gesture "Ctrl-c" and sends the "copy" command to the application.

Figure 4:
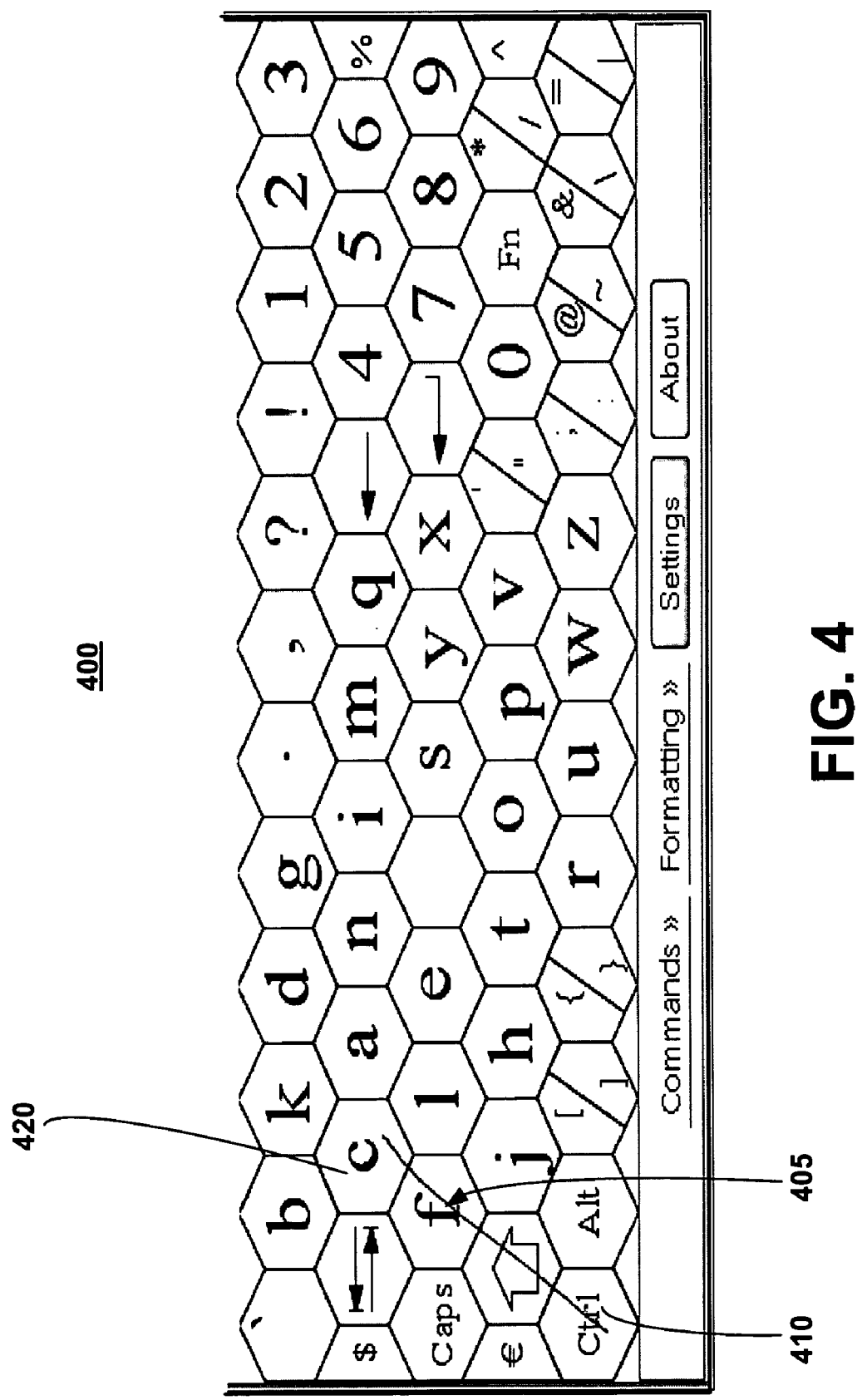
FIG. 4 is a screen shot of an exemplary pen-stroke on the graphical keyboard command interface with an ATOMIK layout in which the "copy" command is activated by the user, according to the command pattern recognition system of FIGS. 1 and 2.

Similarly, FIG. 4 illustrates a pen command gesture 405 on a graphical keyboard 400 with an ATOMIK layout (further referenced herein as the ATOMIK graphical keyboard 400) for activating the "copy" command. The command gesture 405 sequentially traverses a virtual "Ctrl" key 410 and a virtual "c" key 420. System 10 detects a command gesture "Ctrl-c" and sends the "copy" command to the application.

Figure 5:
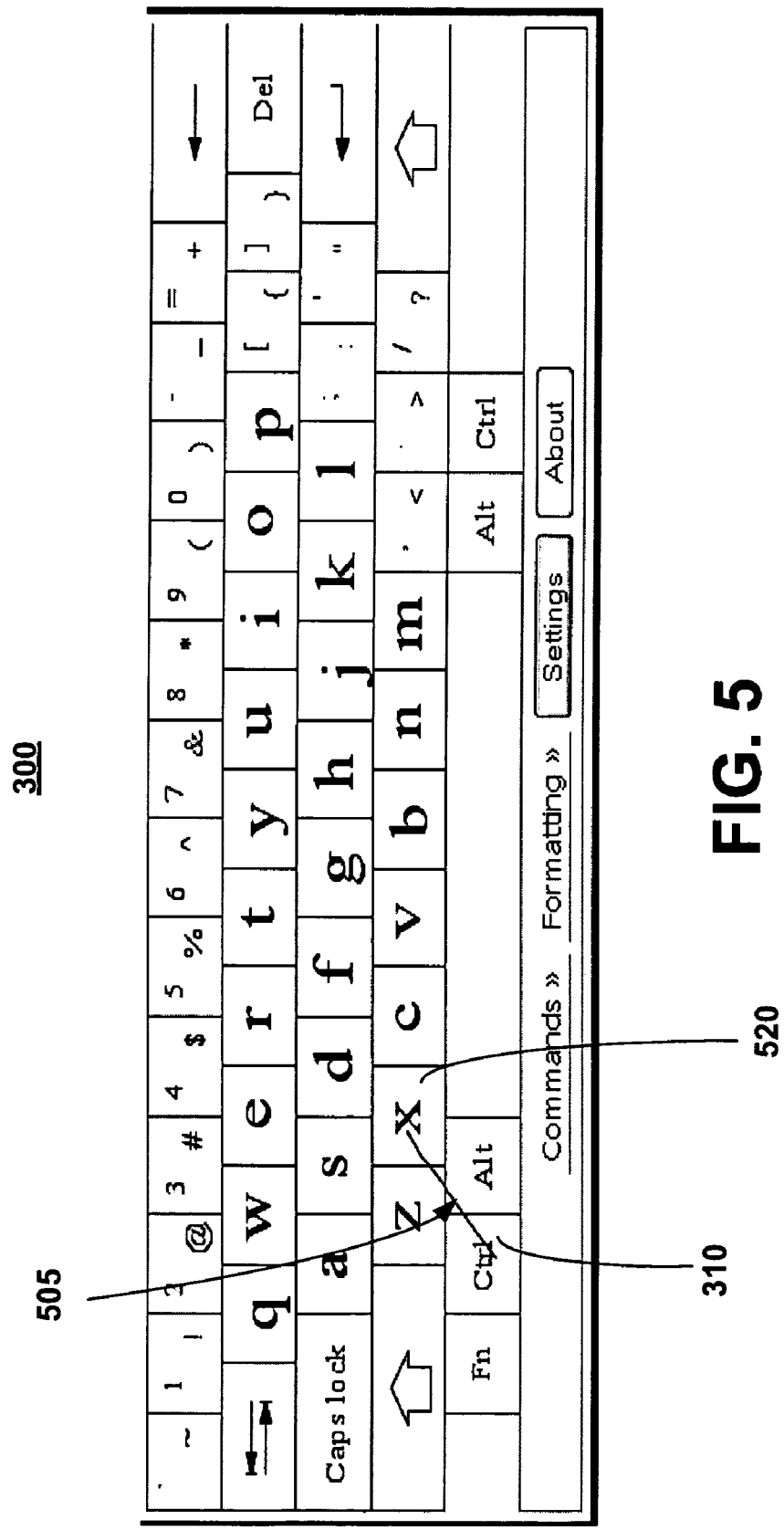
FIG. 5 is a screen shot of an exemplary pen-stroke on the graphical keyboard command interface with QWERTY layout in which a "cut" command is activated by the user, according to the command pattern recognition system of FIGS. 1 and 2.

FIG. 5 illustrates a command gesture 505 on the QWERTY graphical keyboard 300 for activating a "cut" command. The command gesture 505 sequentially traverses the virtual "Ctrl" key 310 and a virtual "x" key 520. System 10 detects a command gesture "Ctrl-x" and sends the "cut" command to the application.

Figure 6:
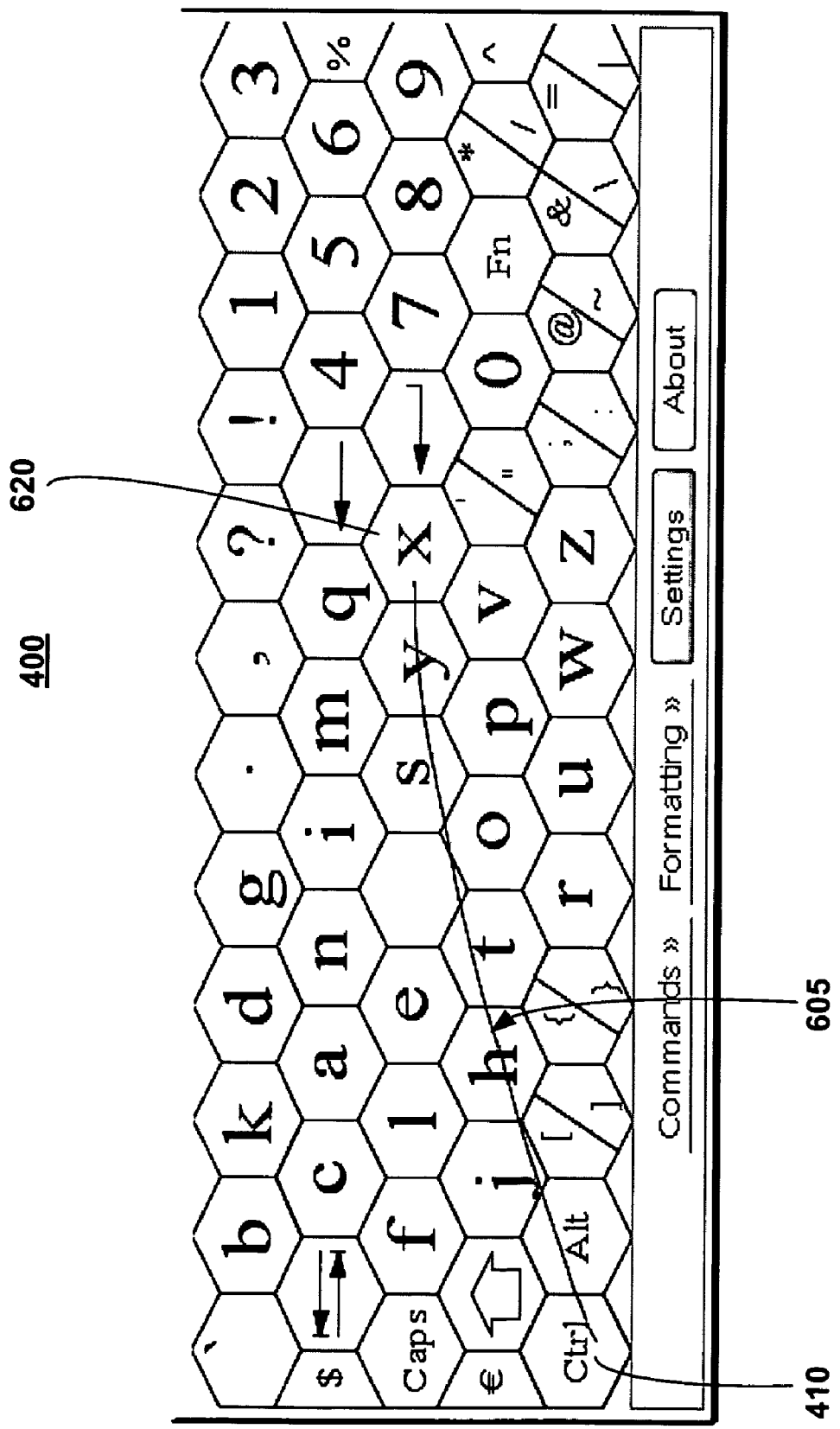
FIG. 6 is a screen shot of an exemplary pen-stroke on the graphical keyboard command interface with an ATOMIK layout, in which the "cut" command is activated by the user, according to the command pattern recognition system of FIGS. 1 and 2.

Similarly, FIG. 6 illustrates a command gesture 605 on the ATOMIK graphical keyboard 400 for activating the "cut" command. The command gesture 605 sequentially traverses the virtual "Ctrl" key 410 and a virtual "x" key 620. System 10 detects a command gesture "Ctrl-x" and sends the "cut" command to the application.

Figure 7:
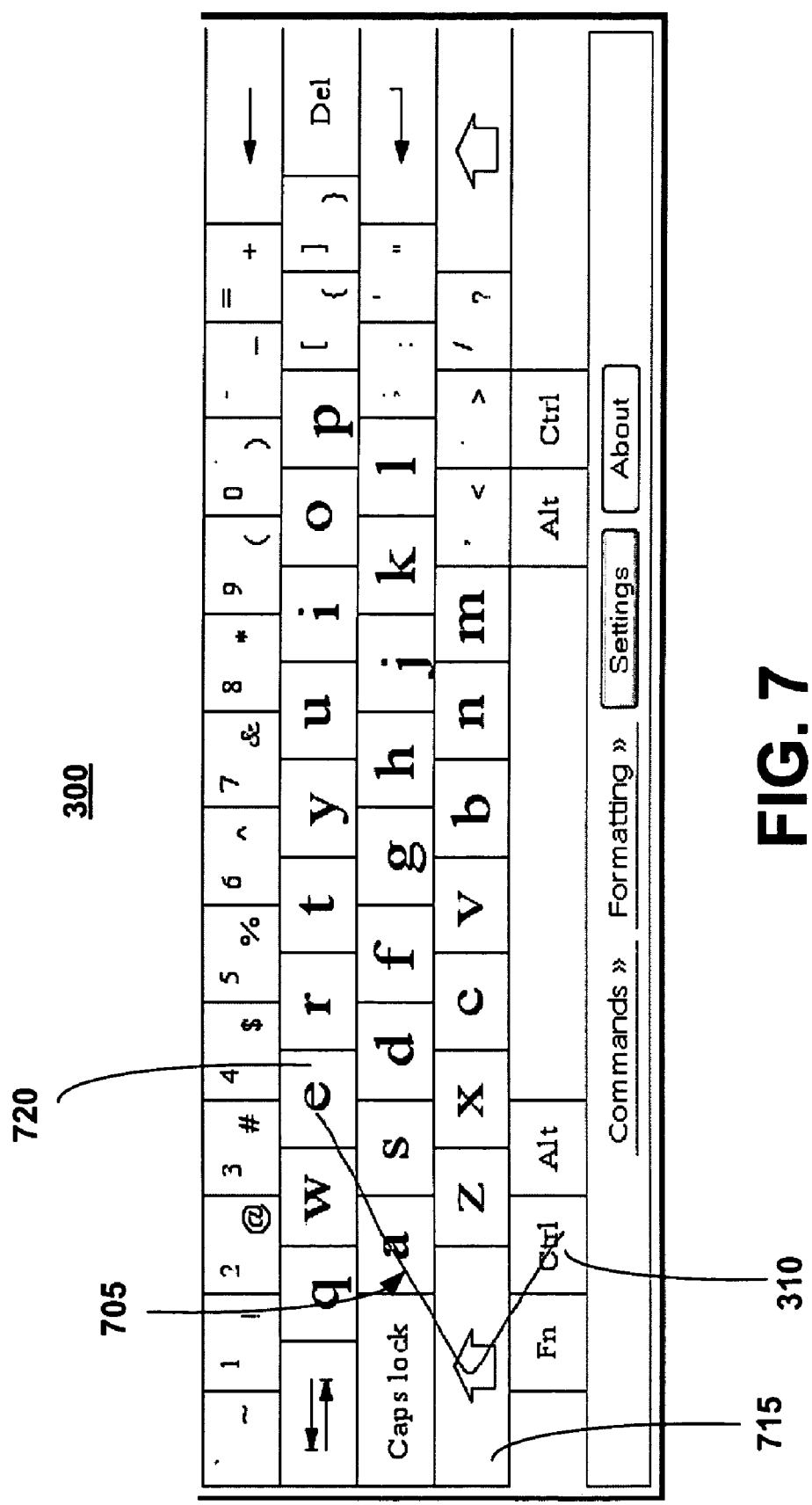
FIG. 7 is a screen shot of an exemplary pen-stroke on the graphical keyboard command interface with a QWERTY layout in which a "track changes" command is activated by the user, according to the command pattern recognition system of FIGS. 1 and 2.

FIG. 7 illustrates a pen-stroke on a QWERTY keyboard 300 for activating a "track changes" (Ctrl-Shift-E in Microsoft Word) command. The command gesture 705 sequentially traverses the virtual "Ctrl" key 310, a virtual shift key 715, and a virtual "e" key 720. System 10 detects a command gesture "Ctrl-Shift-E" and sends the "track changes" command to the application.

Figure 8:
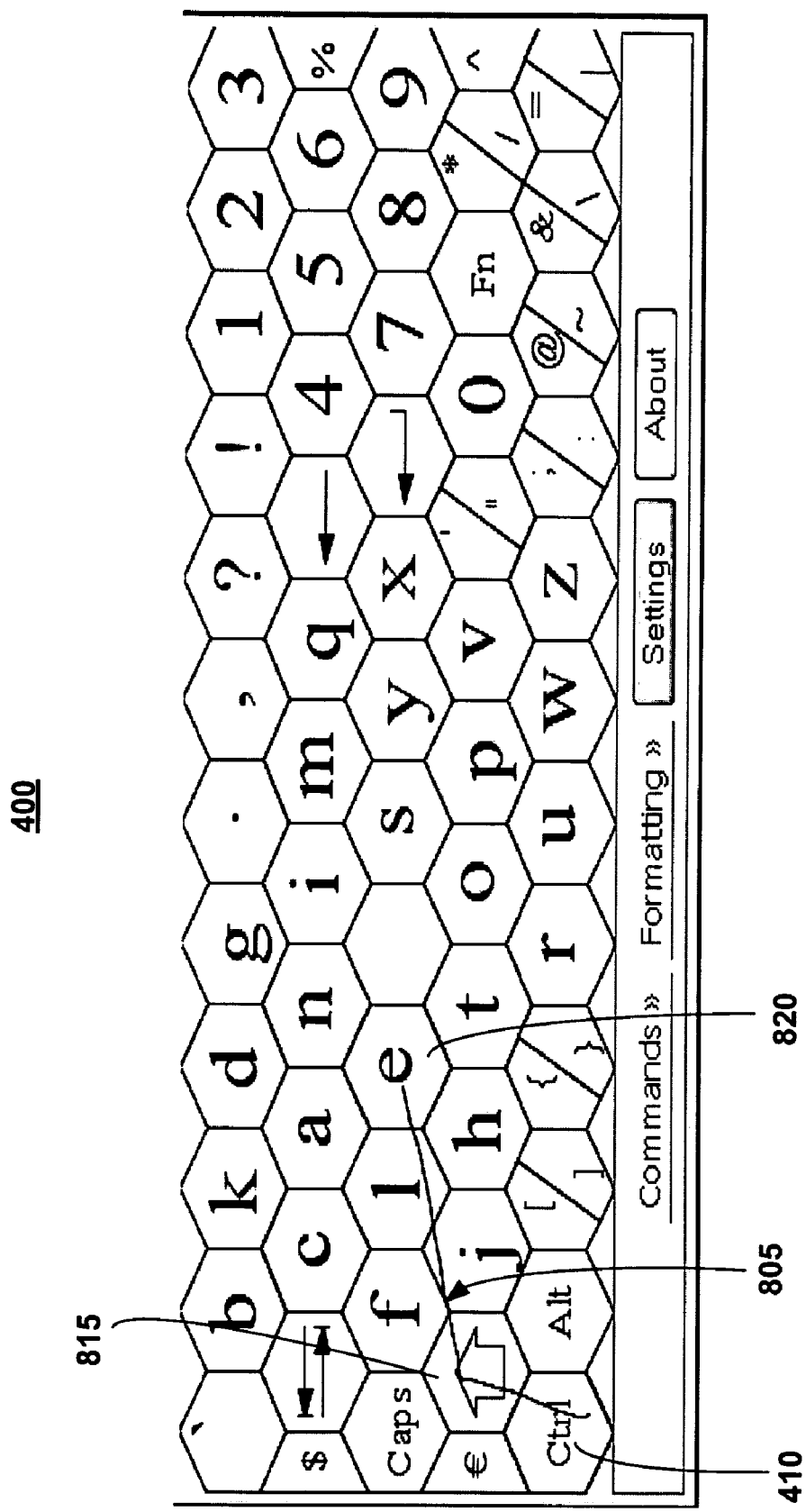
FIG. 8 is a screen shot of an exemplary pen-stroke on the graphical keyboard command interface with an ATOMIK layout in which the "track changes" command is activated by the user, according to the command pattern recognition system of FIGS. 1 and 2.

Similarly, FIG. 8 illustrates a command gesture 805 on an ATOMIK graphical keyboard 400 for activating a "track changes" command. The command gesture 805 sequentially traverses the virtual "Ctrl" key 410, a virtual shift key 815, and a virtual "e" key 820. System 10 detects a command gesture "Ctrl-Shift-E" and sends the "track changes" command to the application.

Figure 9:
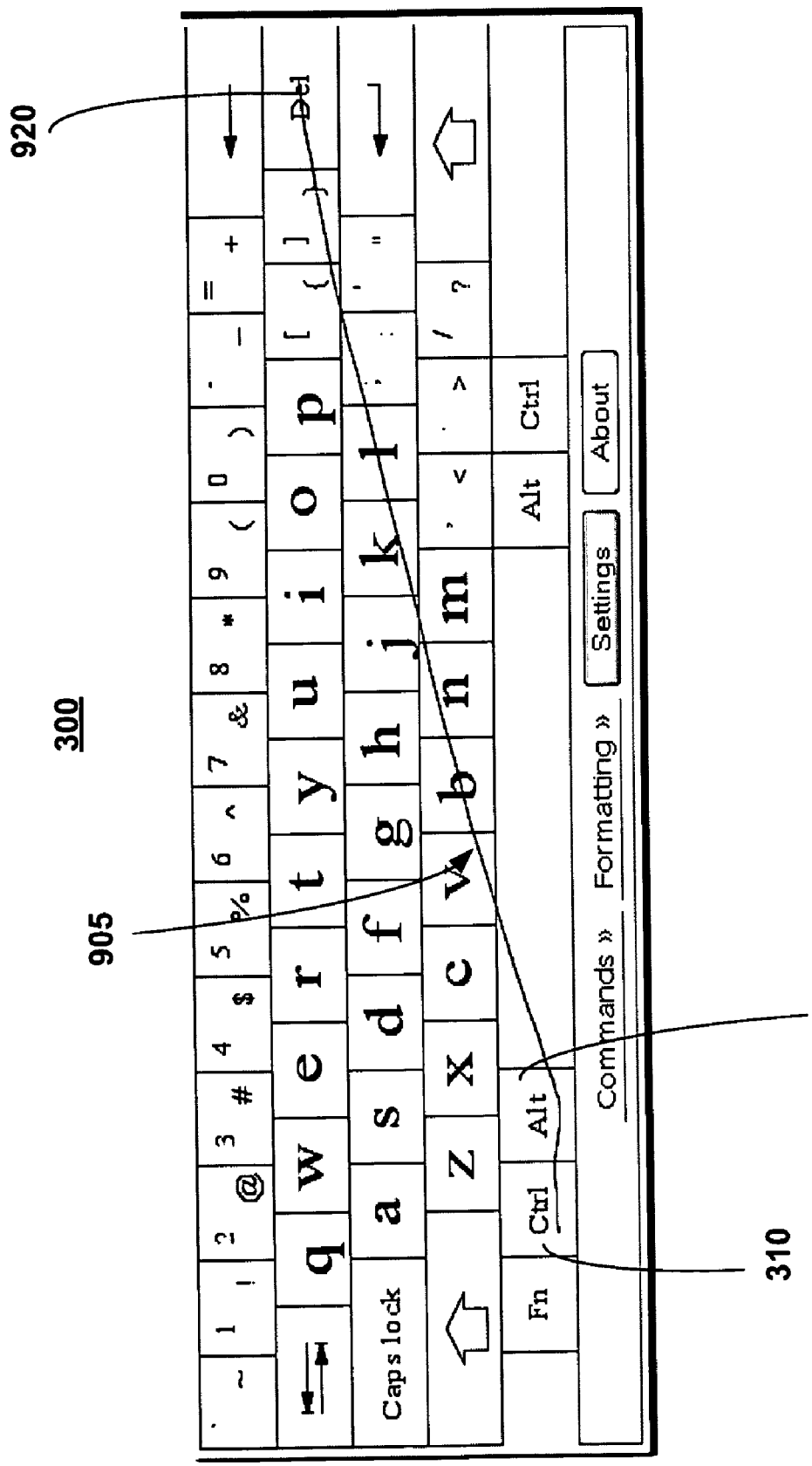
FIG. 9 is a screen shot of an exemplary pen-stroke on the graphical keyboard command interface with QWERTY layout in which an operating system "reboot" command (Ctrl-Alt-Del) is activated by the user, according to the command pattern recognition system of FIGS. 1 and 2.

FIG. 9 illustrates a command gesture 905 on the QWERTY graphical keyboard 300 for activating a "reboot" command (Ctrl-Alt-Del). The command gesture 905 sequentially traverses the virtual "Ctrl" key 310, a virtual "Alt" key 915, and a virtual "Del" key 920. System 10 detects a command gesture "Ctrl-Alt-Del" and sends the "reboot" command to the application or the operating system.

Figure 10:
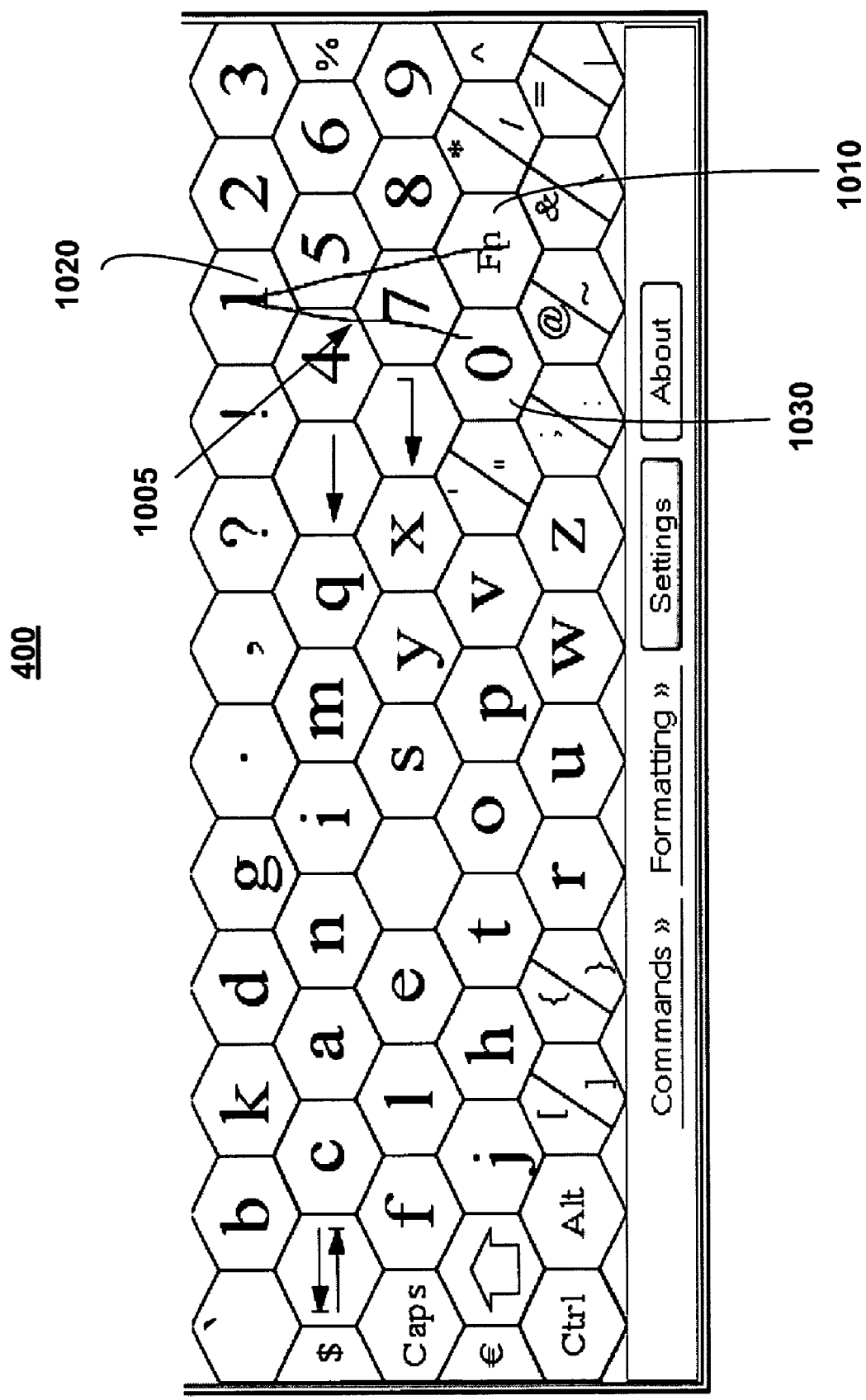
FIG. 10 is a screen shot of an exemplary pen-stroke on the graphical keyboard command interface with an ATOMIK layout in which an "F10" command is activated by the user, according to the command pattern recognition system of FIGS. 1 and 2.

FIG. 10 illustrates a command gesture 1005 on the ATOMIK graphical keyboard 400 for activating an "F10" command. The command gesture 1005 sequentially traverses a virtual "Fn" key 1010, a virtual "1" key 1020, and a virtual "0" key 1030. System 10 detects a command gesture "F10" and sends the "F10" command to the application.

Figure 11A:
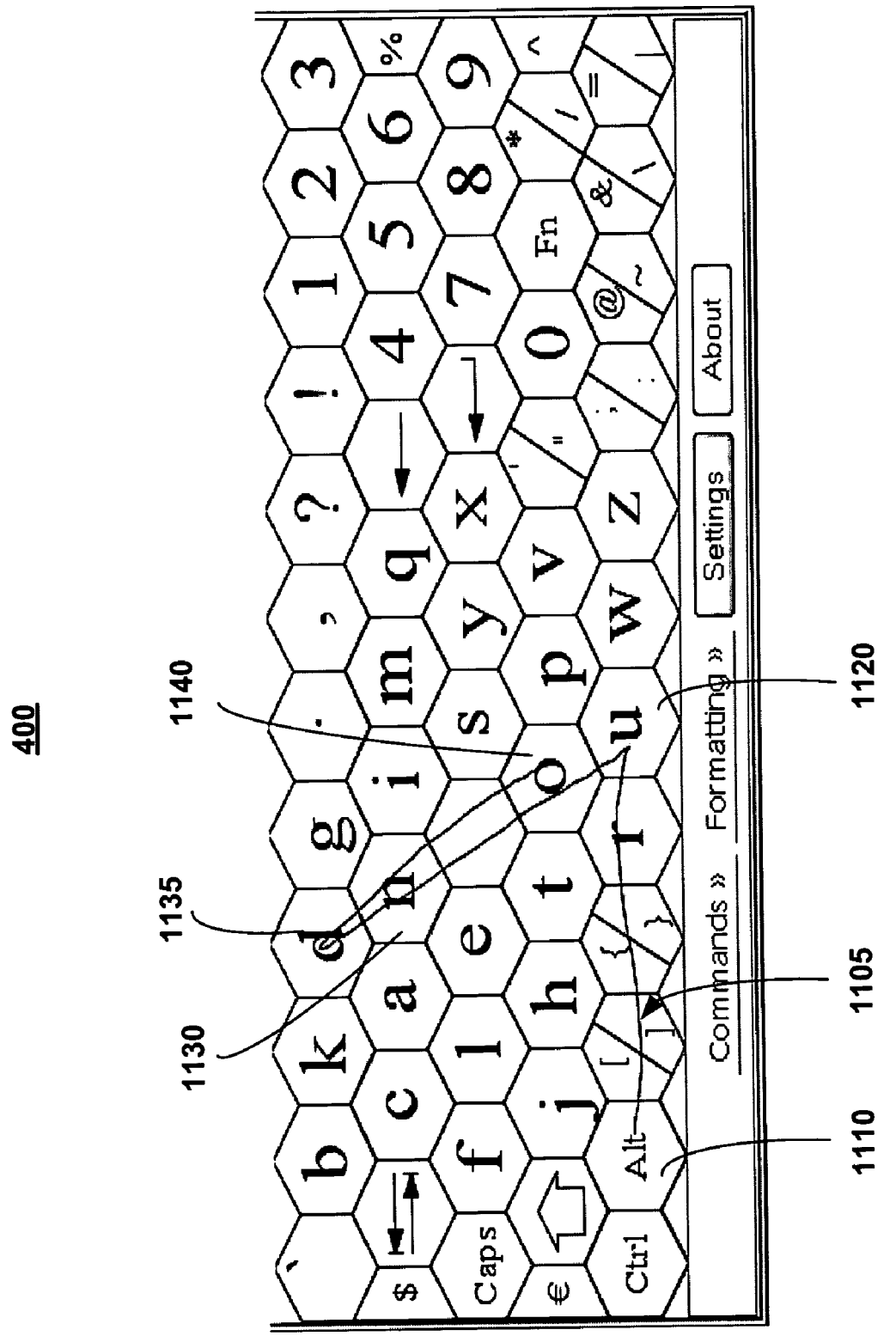
FIG. 11A is a screen shot of an exemplary pen-stroke on the graphical keyboard command interface with an ATOMIK layout in which an "undo" command is activated by the user, according to the command pattern recognition system of FIGS. 1 and 2, illustrating the ability of the present system to spell out the desired commands such as the "undo"

FIG. 11A illustrates an alternative command gesture 1105 on the ATOMIK graphical keyboard 400 for activating an "Undo" command (Alt-u-n-d-o). The command gesture 1105 sequentially traverses a virtual "Alt" key 1110, a virtual "u" key 1120, a virtual "n" key 1130, a virtual "d" key 1135, and a virtual "o" key 1140. The user then lifts the stylus to confirm the choice. System 10 detects a pen command gesture "Alt-u-n-d-o" and sends the "Undo" command to the application.

Figure 11B:
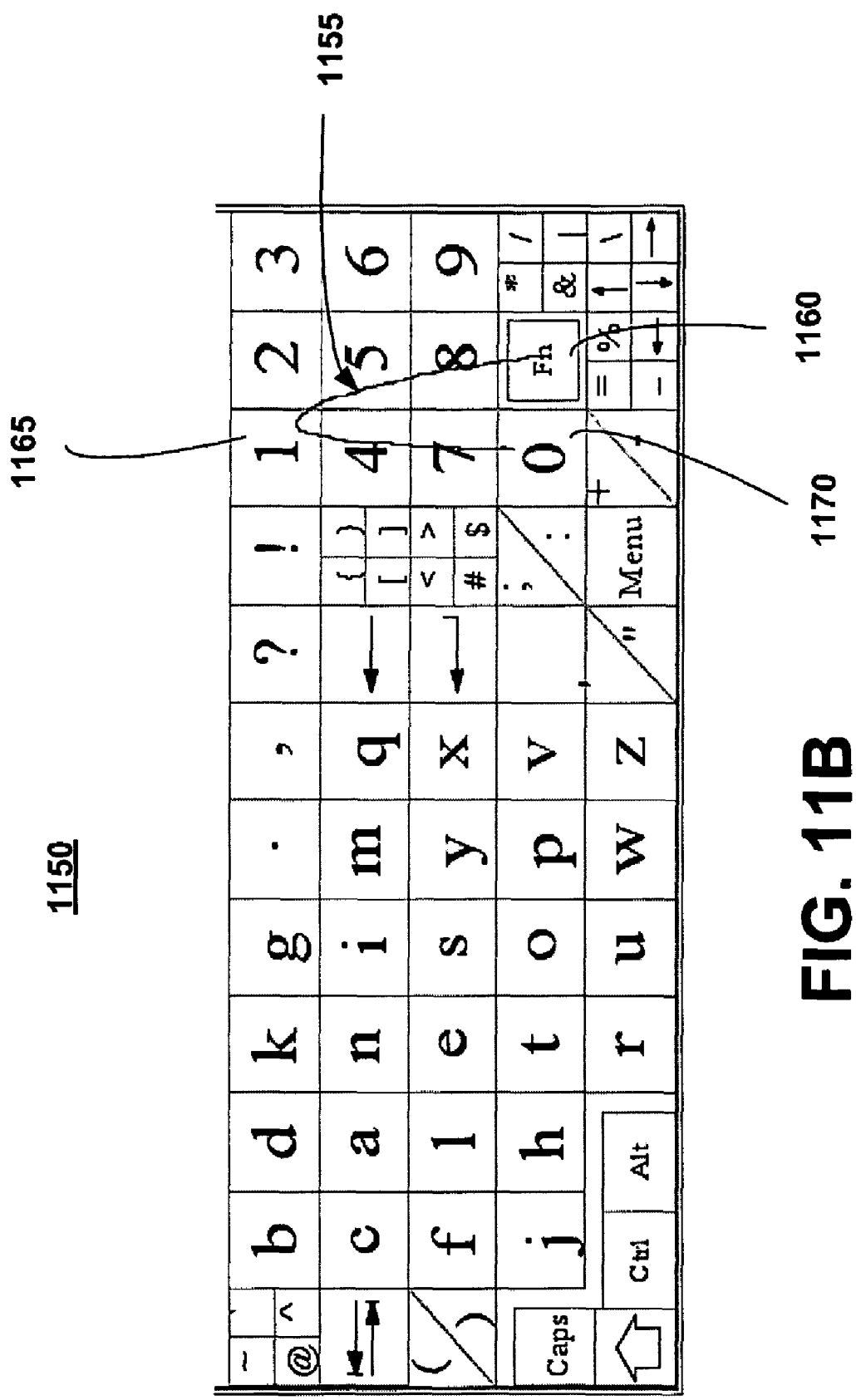
FIG. 11B is a screen shot of an exemplary pen-stroke on the graphical keyboard command interface with a modified ATOMIK layout in which an "F10" command is activated by the user, by a gesture shortcut Fn-1-0.

FIG. 11B illustrates another command gesture 1155 on a modified ATOMIK graphical keyboard 1150 for activating an "F10" command (Fn-1-0). The command gesture 1155 sequentially traverses a virtual "Fn" key 1160, a virtual "1" key 1165, and a virtual "0" key 1170. The user then lifts the stylus to confirm the choice. System 10 detects a pen command gesture "Fn-1-0" and sends the "Fn" command to the application.

While only the QWERTY and the ATOMIK graphical keyboards 300, 400 and selected exemplary command gestures are illustrated, it should be clear that other graphical keyboards can be used to execute various other command gestures. Other exemplary command gestures include, but are not limited to, "make it bold" (Ctrl-B) command, "select all" (Ctrl-A) command, and "paste" (Ctrl-V) command.

On occasion, system 10 selects an command for the command gesture that is not the command intended by the user, either due to ambiguity in recognizing the command or due to sloppiness of the command gesture entered by the user. To avoid mistaken commands, a number of confirmation and ambiguity resolution methods can be employed.

FIG. 3 further illustrates one embodiment according to which a most likely candidate command 340 is initially displayed. A user can tap on the displayed candidate command 340 and system 10 will issue the displayed candidate command 340 to the software application in current focus or the operating system, or another application chosen by a scheme supplied by the system designer. If, however, the user presses on the candidate command 340 and performs a predetermined action such as, for example, holding (or sliding down), a pop-up menu 350 is displayed with other likely choices. The user can slide the stylus down to the desired command choice and lift the stylus to confirm the choice. Those skilled in the art can implement many other variations to this concept without deviating from the spirit of this invention. For example a pie menu, or a liner menu expanding in different directions can alternatively be used.

The "N-best" candidate list is ranked by the probability outputs from integrator 225. Each command gesture typically matches to multiple templates to a varying degree as measured by the probability outputs from integrator 225. Those commands whose matching probability scores pass a set threshold are displayed in the selection menu 350. Those skilled in the art can implement many variations to this concept, without deviating from the spirit of the invention.

Each command stored in the command gesture database 220 can have a single command template representation or additional command template representations. Commands with gestures involving duplicate keys on both sides of the QWERTY layout (e.g., the shift key) have more than one command template. Commands may also have more than one command template when abbreviations or multiple abbreviations are introduced for the same command. For example, for an command "Thesaurus", the following command templates can reside in the command template database 220: "Shift-F7", "Ctrl-T-H-E-S-A-U-R-U-S", "Ctrl-T-H-E-S-A", or "Ctrl-T-H-E-S".

As a useful feedback to the user, the command output 235 can indicate to the user how far the command gesture diverges from the command template of the recognized command. Similarity is measured using spatial distance. Consequently, system 10 can perform a mapping between the command gesture and the command template that is displayed by command output 235. The command gesture is gradually transformed or "morphed" to the shape of the command template using a morphing process. The morphing process is a dynamic process. Consequently, the user can see which parts of a shape least match the command template and adjust future command gestures for that command to more closely match the command template.

In another embodiment, system 10 identifies separate line segments and curvature areas in the command gesture. [Reference is made, for example, to Duda, R. O., et. al., "Pattern Classification and Scene Analysis", 1973, John Wiley & Sons.] The command output 235 morphs these line segments and curvature areas individually to the corresponding segments in the command template. This approach gives the user an understanding of which segments in the command gesture least matched the command template.

The contributions of the shape channel 210 and the location channel 215 are different depending on how the user performed the command gesture. Consequently, user feedback from system 10 models this behavior. System 10 translates and scales the command template to the central point and size of the command gesture if the command gesture was recognized as the output command based on output from the shape channel 210.

If system 10 recognizes the output command based on location information from the location channel 215, the command gesture is morphed into the command template projected on corresponding virtual keys in a virtual keyboard layout. In this manner, the feedback system of system 10 emphasizes how the user can improve the writing of the command gesture to produce more easily recognized shapes for the given mode.

In one embodiment, the command output 235 colors points on the morphed command gesture differently based on how closely the point in the command gesture matches the command template. In a further embodiment, the command output 235 colors segments and curvatures of the morphed command gesture differently based on how closely the segment or curvature matches the command template. By coloring portions of the command gesture differently, the feedback system of system 10 emphasizes the portions of the command gesture that were least like the command template, helping the user refine the command gesture and enhancing the learning process.

Figure 12A:
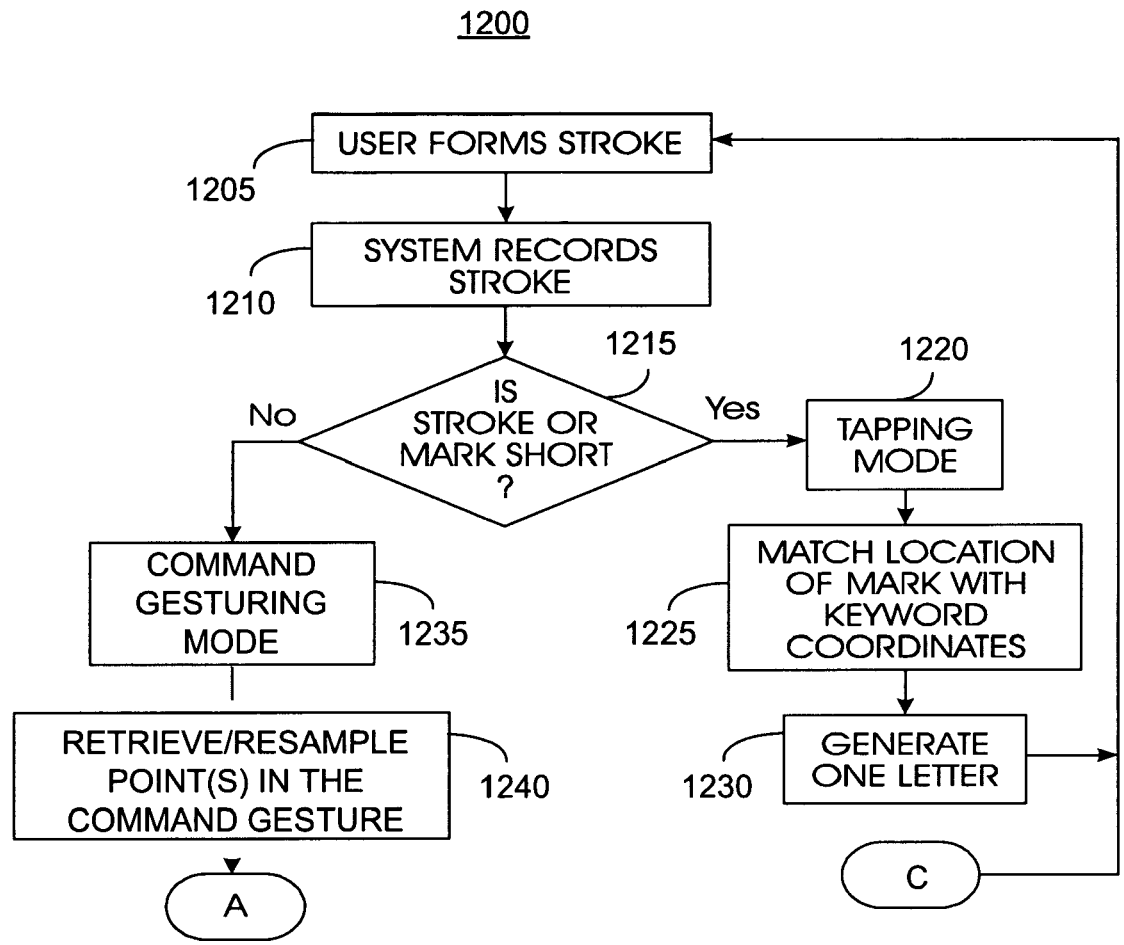
FIG. 12 comprises FIGS. 12A, 12B, and 12C, and represents a process flow chart that illustrates a method of recognizing command gestures by the command pattern recognition system of FIGS. 1 and 2.
Figure 12B:
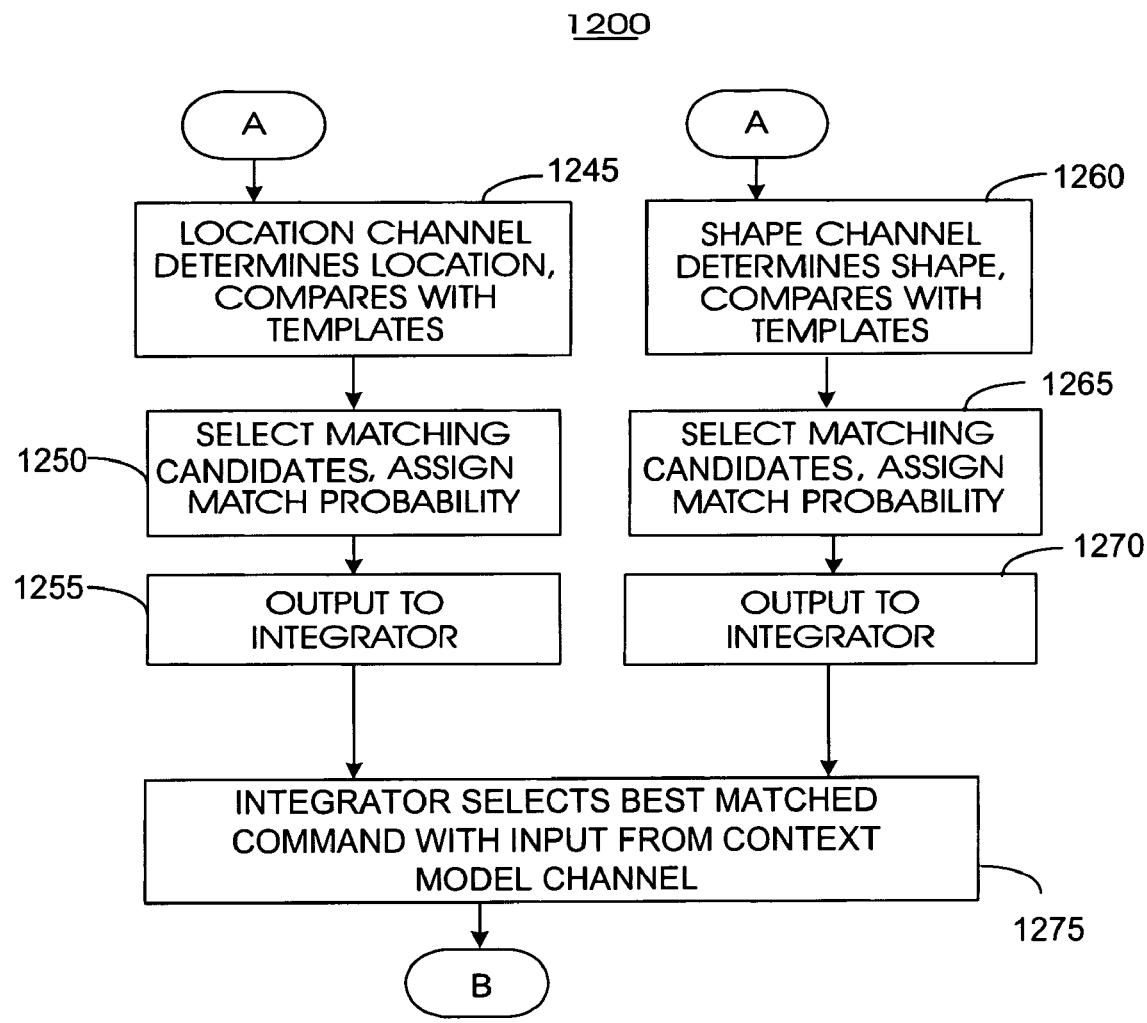
Figure 12C:
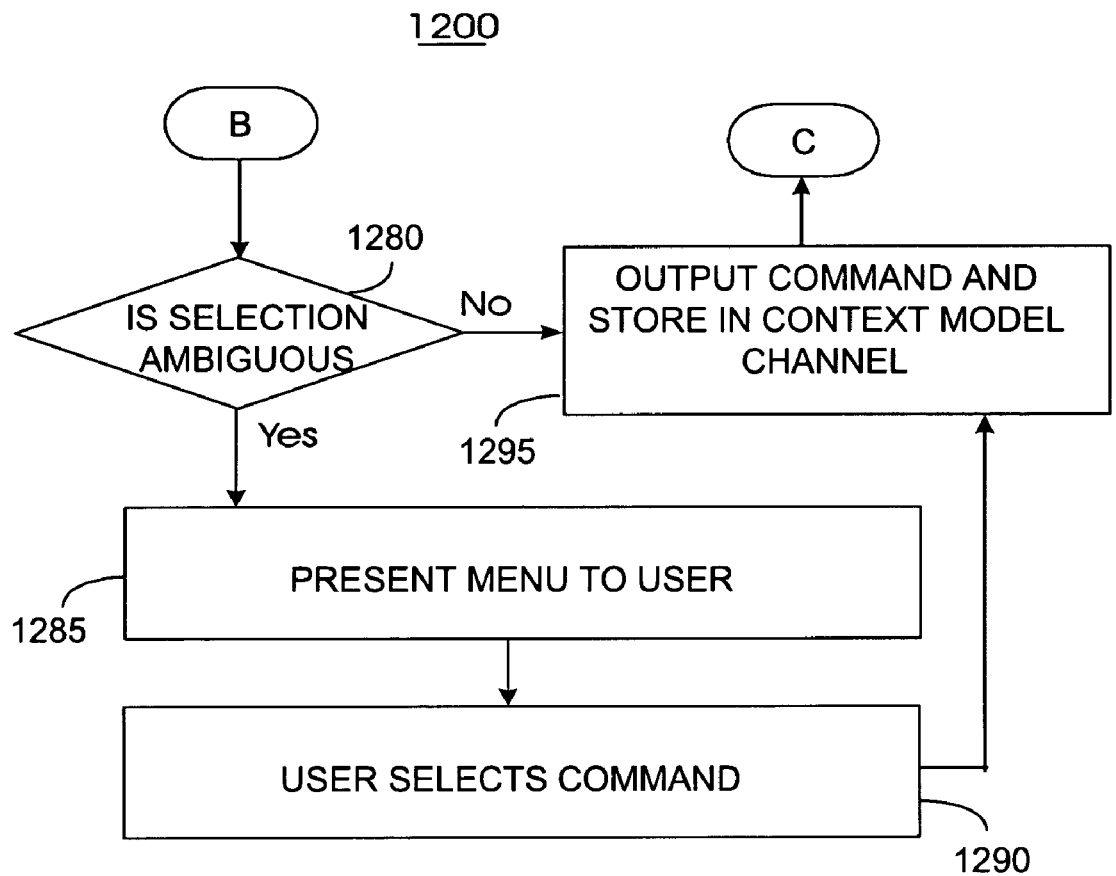

The process flow chart of FIG. 12 (FIGS. 12A, 12B, 12C) illustrates a method 1200 of system 10. At block 1205, the user forms a stroke on a virtual keyboard. The stroke can be short, as in a tap, or long, as in a command gesture.

System 10 captures and records the stroke at step 1210. At decision step 1215, system 10 determines whether the stroke or mark was short. If it is, the user is in tapping mode (step 1220) and system 10 is instructed to select letters individually on the virtual keyboard. System 10 correlates the tap with a letter by matching the location of the mark with keyboard coordinates at step 1225, and by generating one letter at step 1230. System 10 then returns to step 1205 when the user forms another stroke.

If at decision step 1215 the user's stroke on the virtual keyboard is not short, the user is in command gesturing mode (step [1235]. The gesture interface 205 resamples the stroke performed by the user (i.e., the command gesture) with respect to shape and location at step 1240].

The location channel 215 and the shape channel 210 operate in parallel. The location channel 215 determines the relative location of the points within the command gesture and compares the relative location with the templates in command gesture database 220 (step 1245). The location channel 215 selects commands that meet or exceed a matching threshold at step 1250 and assigns a match probability for each command selected. At step 1250, the location channel 215 may select no commands, one command, or more than one command. The command or commands selected by the location channel 215 are output to integrator 225 at step 1255.

Similarly, the shape channel 210 determines the normalized shape of the points within the command gesture and compares the normalized shape with the templates in command gesture database 220 (step 1260). The shape channel 210 selects commands that meet or exceed a matching threshold at step 1265 and assigns a match probability for each command selected. At step 1265, the shape channel 210 may select no commands, one command, or more than one command. The command or commands selected by the shape channel 210 are output to integrator 225 at step 1270.

At step 1275, integrator 225 analyzes the inputs from the location channel 215 and the shape channel 210 in conjunction with input from the context model channel 230. In one embodiment, additional channels may be used to analyze the command gestures. Combining the probability input from multiple channels by for example probability integration by, for example, Bayes' Rule, integrator 225 selects the highest probability candidate as the one best command. In step 1280, the confidence level of the best command is evaluated by, for example, comparing the probability value of the most likely command with the values of the next best candidates.

If, at decision step 1280, the selection of command is highly ambiguous, a multiple-choice menu is presented to the user in step 1285. Whether the command selection is ambiguous can be determined by the probability distribution of the N-best candidate command list from the output of integrator 225. In one embodiment, if the probability difference between the top candidate command and lower ranked candidate command is smaller than a set threshold, the selection is judged highly ambiguous and a N-best menu is presented to the user to select. The user selects a command from the menu at step 1290. The selected command is then output to command output 235 and stored in the context model channel 230 at step 1295. Otherwise, if the selected command is not ambiguous (decision step 1280), the selected command is output to command output 235 and stored in the context model channel 230 at step 1295.

A command has now been selected for the command gesture, all other processing of the command gesture stops, and operation returns to step 1205 when the user initiates another stroke on the virtual keyboard. Integrator 225 may also take input from the context model channel 230. The context model channel 230 provides recent commands and language rules to assist integrator 225 in the selection of the best-matched command.

The command gesture database 220 can also be adapted to the current application in focus. Each application, such as Microsoft Word, has a subset of shortcut commands compared to all shortcuts in all applications. System 10 can therefore use a smaller database in context to search for the more reliable best choice.

As previously indicated, the system 10 can be unified with a shorthand word gesture recognition system. There are various methods to clearly separate a command gesture from a word shorthand gesture. In one embodiment, only gestures started from the command keys, such as ctrl, alt, and Fn are considered for recognition of a command gesture.

System 10 is not limited to a virtual keyboard with alphanumeric keys. System 10 can be equally applied to any virtual keyboard that includes a plurality of keys with symbols. Special control panels can be constructed for any command and/or control purpose. In a special control panel, each key can be a command by itself, and a series of commands, such as "selecting red color, selecting two pixel-width, selecting circle shape" can be invoked by one gesture.

The present invention complements linear pull-down menu selection as a faster shortcut approach to frequently used commands. The present invention may also work with any other menu selection method such as pie menus.

It is to be understood that the specific embodiments of the invention that have been described are merely illustrative of certain applications of the principle of the present invention. Numerous modifications may be made to the system and method for recognizing command patterns based on a virtual keyboard layout described herein without departing from the spirit and scope of the present invention. The command keys such as alt, ctrl, and Fn can be located anywhere on a virtual keyboard.

Moreover, while the present invention is described for illustration purpose only in relation to a virtual keyboard, it should be clear that the invention is applicable as well to any system in which a stylus (or a digit) can be used to form gestures or strokes such as, for example, an electronic white board, a touch screen monitor, a PDA, an eye-tracker, a cellular phone, a tablet computer, etc., as well as any system that monitors gestures or strokes using, for example, an electronic pen and any system that uses command gestures such as, for example, a court reporting system, dictation system, retail sales terminals, etc.

Furthermore, while reference is made herein to an electronic pen or stylus, it should be clear that other means of trajectory sensing could alternatively be used, without affecting the efficacy of the current invention. For example, the current invention works equally well on a display screen that is sensitive to finger motion if the virtual keyboard is large enough to accommodate the finger size. As another example, the gesture shortcuts methods disclosed herein can also be used with three dimensional finger and hand motion sensing methods, if the virtual keyboard is displayed in 3D through head-mounted or other 3D display means. As yet another example, it is also possible to replace the pen motion with eye movement tracking when the hand is unavailable.

What is claimed is:

1. A method of issuing a command using a graphical keyboard, comprising:
    inputting a movement on the graphical keyboard;
    automatically recognizing the inputted movement as an actual command, based on the inputted movement in relation to a layout of the graphical keyboard by:
    analyzing pattern aspects of the inputted movement by channels, wherein said analyzing utilizes said channels to determine location of said inputted movement and to determine shape of a single said inputted movement;
    comparing the pattern aspects to a command gesture database;
    if no match exists between the pattern aspects and command gesture database, using context clues that are based on one or more previous commands gestured by a user and comparing the context clues with potential commands;
    executing the actual command;
    utilizing multiple command template representations for each of said actual commands whether or not said graphical keyboard contains duplicate keys;
    utilizing shortcut commands of a current application as command template representations of said actual commands;
    teaching the user with a dynamic morphing, process comprising:
        projecting of said command template representation onto said graphical keyboard,
        allowing the user to see which parts of a shape least match said actual command,
        wherein future inputted movements more closely match said command template; and
    teaching the user by coloring points on a morphed command gesture, based on how closely said points match said command template, wherein:
        said coloring points comprise outputting colored points to said graphical keyboard,
        said morphed command gesture comprises inputted movements more closely matching said command template, resulting from the user adjusting to said command template representation projected onto said graphical keyboard with colored points, thereby allowing the user to see which parts of a shape least match said actual command.

2. The method of claim 1, wherein recognizing the movement as a command comprises identifying the pattern aspects of a stroke trace in relation to a layout of the graphical keyboard.

3. The method of claim 2, wherein the command gesture database are stored command templates.

4. The method of claim 3, further comprising defining the command templates.

5. The method of claim 4, wherein defining the command templates comprises using trained models; and
    wherein recognizing the movement comprises classifying gestures according to the trained models.

6. The method of claim 2, wherein recognizing the movement comprises analyzing geometric properties of the movement trajectory.

7. The method of claim 1, wherein the input movement starting within the vicinity of a designated key, triggers the recognition of the movement as an actual command.

8. The method of claim 1, wherein the graphical keyboard includes any one or more of:
    a virtual keyboard operated by any one of: a stylus or a digital pen;
    a virtual keyboard presenting a plurality of keys comprising alphabet-numeric characters;
    a virtual keyboard presenting a plurality of keys comprising a plurality of commands labeled with any one of: a symbol or a word, and wherein a movement trajectory is recognized as a set of commands;
    a virtual keyboard on a touch sensing surface sensitive to finger movement;
    a virtual keyboard projected onto a surface; and
    a virtual keyboard rendered in three dimensional space in a three dimensional display.

9. The method of claim 1, wherein the movement comprises any one of: a pen stroke, a stylus stroke, or a finger trace.

10. The method of claim 1, wherein the channels comprise any one or more of:
    a shape channel;
    a location information; and
    a context model channel.

11. The method of claim 1, further comprising sensing the movement by means of a digital pen.

12. The method of claim 1, further comprising sensing the movement by means of a finger motion on a touch sensor.

13. The method of claim 1, further comprising sensing the movement by tracking a three-dimensional motion of any one of: a user's hand, finger, pointer, or stylus.

14. The method of claim 1, further comprising sensing the movement by means of a tracked eye-gaze movement.

15. A first computer program product having a plurality of instruction codes stored on a computer-readable medium, for issuing a command using a graphical keyboard, the computer program product comprising:
   a first set of instruction codes for capturing a gesture from an input movement on the graphical keyboard such that said input movement is capturable from one of an electronic white board, a touch screen monitor, a personal digital assistant, an eye-tracker, a cellular phone, a tablet computer, an electronic pen, a court reporting system, a dictation system, and a retail sales terminal;
   a second set of instruction codes for automatically recognizing the movement on said graphical keyboard as an actual command, based on:
      determining whether said movement on said graphical keyboard is short or long
      if said movement on said graphical keyboard is short, said second set of instruction codes relates said input movement on the graphical keyboard with a single letter matched to said graphical keyboard at the location of said movement on said graphical keyboard;
      analyzing the captured gesture using at least one shape channel and at least one location channel,
      matching an analyzed movement on said graphical keyboard trajectory with at least one command template in a stored command template database;
   a third set of instructions for comparing an ambiguous movement on said graphical keyboard trajectory with a context model channel to provide an actual command if there is no match in the command template database;
   a fourth set of instruction codes for executing the actual command;
   a fifth set of instruction codes for adapting said first computer program product to an executing second computer program product such that said second computer program product captures said gesture from said input movement on said graphical keyboard;
   a sixth set of instruction codes for teaching the user to match said analyzed movement trajectory with one of said command templates such that said sixth set of codes outputs to the user how far said command templates differ from said analyzed movement trajectory;
   a seventh set of instruction codes for teaching said user to match said analyzed movement trajectory with one of said command templates by outputting colored points along said analyzed movement trajectory on said graphical keyboard,
      wherein said outputting colored points comprises outputting colored points to said graphical keyboard; and
   an eighth set of instruction codes for gradually changing said analyzed movement trajectory to match one of said command templates.

16. The computer program product of claim 15, wherein the second set of instruction codes analyzes the captured gesture using shape and location channels, matching a stroke trace with a stored command template database.

17. The computer program product of claim 16, wherein the stroke trace starting within the vicinity of a designated key triggers the recognition of the movement as a command.

18. An apparatus for issuing a command using a graphical keyboard, the apparatus comprising:
   a first sensing interface for recording movement on said graphical keyboard;
   a plurality of channels for automatically recognizing said movement on said graphical keyboard as a command, based on said movement on said graphical keyboard trajectory in relation to a layout of said graphical keyboard,
   wherein the plurality of channels identifies more than one set of pattern aspects of said movement on said graphical keyboard trajectory in relation to a layout of said graphical keyboard,
   wherein the plurality of channels analyze pattern aspects of said movement on said graphical keyboard trajectory and compare the pattern aspects to a command gesture database;
   an integrator connected to the plurality of channels, for analyzing the movement trajectory,
   wherein the integrator uses context clues from a context model channel,
   wherein the context clues are based on one or more previous commands gestured by a user and are compared with a potential command provided by the plurality of channels,
   wherein the integrator then outputs a best-matched command to be executed;
   wherein the best-matched command comprises a menu action;
   wherein said first sensing interface adapts to a second sensing interface installed on said apparatus wherein said movement on said graphical keyboard records movement on said second sensing interface;
   wherein said apparatus uses a plurality of said channels to analyze the shape of said movement on said graphical keyboard and to analyze location of said movement on said graphical keyboard in relation to said graphical keyboard;
   wherein said integrator teaches the user to match movement on said graphical keyboard to said command gesture by outputting information to said first sensing interface, showing a comparison of information from said command gesture database to said pattern aspects of said movement on said graphical keyboard for teaching the user to see which parts of said movement on said graphical keyboard least match said command gesture database; and
   wherein said apparatus teaches the user to match said movement on said graphical keyboard to said command gesture database by outputting colored points to said first sensing interface where said movement is on said graphical keyboard based on how closely said pattern aspects match said command gesture database,
      wherein said outputting colored points comprises outputting colored points to said graphical keyboard.

* * * * *